May 17, 1960     C. E. GATES     2,937,052
FLUID PRESSURE BRAKE VALVES
Filed Dec. 3, 1956
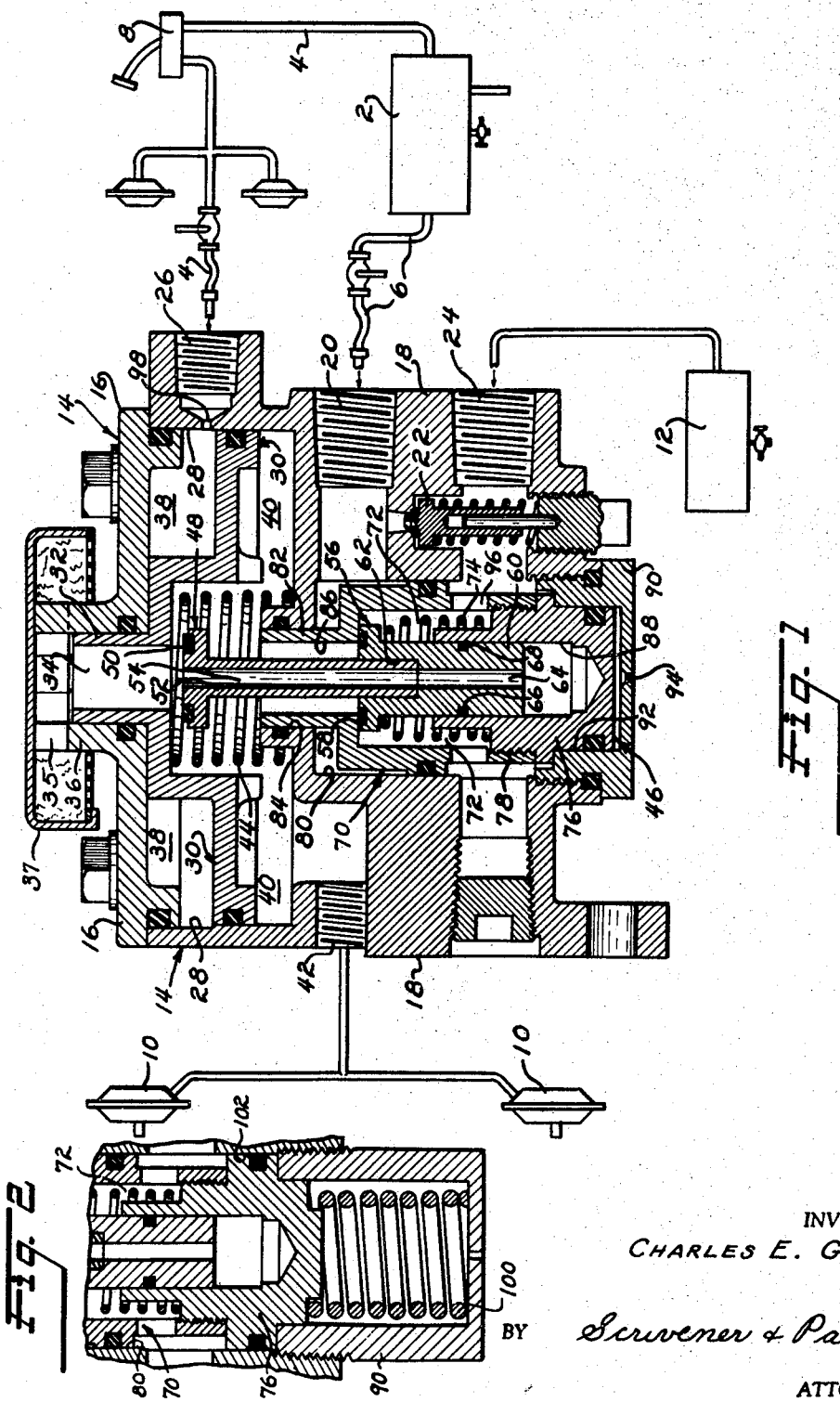
INVENTOR
CHARLES E. GATES
BY *Scrivener & Parker*
ATTORNEYS

United States Patent Office 2,937,052
Patented May 17, 1960

2,937,052

FLUID PRESSURE BRAKE VALVES

Charles E. Gates, Elyria, Ohio, assignor to Bendix-Westinghouse Automotive Air Brake Company, Elyria, Ohio, a corporation of Delaware Application December 3, 1956, Serial No. 625,986

15 Claims. (Cl. 303—29)

This invention relates to fluid pressure valves and more particularly to an improved self-lapping type of relay emergency valve particularly useful in connection with tractor-trailer braking systems using a gaseous pressure medium, such as compressed air.

The principal object of the present invention is the provision of an improved relay emergency valve for braking systems for relaying emergency reservoir pressure to the brake actuators upon a service application of the brakes and which automatically applies the brakes upon a failure of the service brake applying means.

Another object of the invention is the provision of a novel relay emergency valve which provides automatic intantaneous or a dynamiting brake application in the event of trailer breakaway or of complete emergency line rupture.

Another object of the invention is the provision of an improved relay emergency valve which includes an arrangement for obtaining a gradual automatic brake application in the event of a slow leak in the brake system.

Still another object of the invention is the provision of the automatic gradual brake setting means set forth in the foregoing paragraph wherein the application pressure is inversely proportional to the main reservoir pressure.

Yet another object of the invention is the provision of an improved relay emergency valve which includes means for preventing the flow of fluid from an emergency reservoir to the main reservoir.

A still further object of the invention is the provision of an improved relay emergency valve having an exhaust and an inlet and which is of the self-lapping type for positively closing the exhaust prior to effecting opening of the inlet thereby preventing loss of reservoir pressure to exhaust.

Another object is to provide an improved self-lapping relay emergency valve which includes balanced inlet valve means so arranged as to decrease to a minimum the lap range of the relay emergency valve.

Another object is the provision of an improved relay emergency valve which includes means for preventing over-shooting and chatter of the valve elements.

Other objects and their attendant advantages will become apparent as the following detailed description is read in conjunction with the accompanying drawing which illustrates two embodiments of the invention.

Referring to the drawing, wherein similar reference characters refer to similar parts throughout the several views:

Fig. 1 is a diagrammatic view of a fluid pressure brake system showing a vertical cross-section view of the relay emergency valve of one form of the present invention, and Fig. 2 is a partial view, in section, of a modification of the valve of Fig. 1.

As shown in Fig. 1, the valve of the invention is illustrated in connection with a tractor-trailer braking system which includes a tractor carried main reservoir 2 which is supplied with compressed air by a compressor (not shown). The main reservoir 2 has service and emergency outlets 4 and 6, the former leading to a manually operated brake valve 8 and the latter leading rearwardly for connection to the trailer system. The service line, after passing through the brake valve 8, likewise leads rearwardly to the trailer system. The trailer system includes trailer brake chambers or actuators 10 and emergency reservoir 12, both of which are interconnected with service and emergency lines 4 and 6 through the relay emergency valve 14 of the present invention.

It will be apparent that though the foregoing system has been described in connection with a tractor-trailer braking system, this is by way of illustration only since the valve of the present invention is applicable to any fluid pressure operated brakes regardless of where they may be utilized.

With particular attention to the valve 14 of the invention, this device comprises an upper cover member 16 and a lower body or casing member 18 bolted rigidly together to form a housing for the valve mechanism. The main reservoir 2 is connected by way of emergency line 6 to an inlet port 20 in the body 18 which in turn is connected through a one-way check valve 22 with a port 24 leading to the emergency reservoir 12. It will be apparent that with this arrangement when the pressure in the emergency reservoir 12 is a predetermined amount lower than the pressure in the main reservoir 2, the check valve 22 is unseated and fluid flows from reservoir 2 to reservoir 12 from whence it is prevented from returning to the main reservoir by the check valve 22.

The brake valve 8 in the service line 4 on the tractor is of the usual self-lapping type which delivers pressure in proportion to its degree of actuation. From the brake valve fluid pressure passes through the service line 4 to a service port 26 in the body 18 of the valve of the invention. Port 26 in turn is connected to a bore 28 in the upper part of the body 18 which contains therein a relay piston 30 provided with a guide portion 32 having a central bore 34 therethrough and which slidably engages a hollow guide 36 centrally disposed in the cover 16. The bore 34 and ports 35 in the guide 36, in conjunction with dirt collector 37, serve as an exhaust path for the relay valve of the invention in a manner to be described.

The cover 16 with the bore 28 and guide 32 forms a relay cavity 38 above the piston 30 and the space below the piston forms a delivery cavity 40 which communicates via a port 42 with the brake actuators 10. A spring 44 abuts on a portion of the body 18, as shown, and urges the piston 30 upwardly to the position shown.

The inlet and emergency portion of the valve of the invention is indicated generally by the numerical 46 and this portion is essentially a self-contained unit and comprises a plurality of elements the first of which is an exhaust valve 48 having a yielding valve member 50 and an elongated stem 52 provided with a central bore 54. The second element consists of an inlet valve 56 provided with a yielding valve member 58 and having an elongated valve stem 60 with a counter-bore 62 therein for receiving the elongated stem 52 of the exhaust valve 48. The stem 52 fits into the counter-bore of the valve 56 with a press fit so that the two elements form an integral unit. The stem 60 of the valve 56 has a bore 64 in axial alignment with the bore 54 of valve 48 and is provided with an external groove 66 for accommodating a seal 68. The third element of the inlet and emergency portion 46 comprises an emergency pressure responsive element such as piston 70 having a cavity 72 adapted to encompass the inlet valve 56 which is normally urged to the closed position shown by a spring 74 compressed between the valve 56 and a shoulder on an emergency piston cap nut 76, the latter being threadedly connected at 78 with the piston 70. The emergency piston operates a cylindrical bore 80 in the body 18 of the valve and is subjected at all times to pressure in the main reservoir 2 by way of emergency line 6 and inlet port 20. The emergency piston is also provided with a central cylindrical guide portion 82, having a central bore 86, and is sealingly and slidably operable in a bore 84 in the body 18. The cap-nut 76 is likewise provided with a central bore 88 to slidingly receive the stem 60 of the valve 56. The four elements above described, namely, the exhaust valve 48, the inlet valve 56, the emergency piston 70 and the cap-nut 76 are normally first assembled as a unit and then inserted into the valve body where they are confined by a cap-nut 90 which is provided with a bore 92 to sealingly and slidingly receive the emergency piston cap-nut 76. A port 94 is provided in the bottom of bore 92 for venting at all times the space beneath the piston cap-nut 76 to atmosphere.

From the above description it will be observed that the inlet-emergency portion 46 of the valve is composed of two relatively movable elements: one, the emergency piston 70 in combination with emergency piston cap-nut 76 which slidably moves relative to the casing 18 and the cap-nut 90; and two, the inlet valve 56 in combination with the exhaust valve 48 which moves relative to the emergency piston 70 as well as to the casing 18. It will be further noted that the cavity formed by the bore 88 in the emergency piston cap-nut 76 is vented via the aligned passageways 64 and 54 in the valve stems 60 and 52 respectively to atmosphere by way of the passage 34 in the relay piston 30.

The inlet cavity 72 in the emergency piston 70 is exposed at all times to the pressure in the emergency reservoir 12 through a port 96 in the valve body so that emergency reservoir pressure normally acts on the bottom of inlet valve member 58 when in closed position. The bore 88 in the emergency piston cap-nut 76 is preferably equal to or slightly larger than the bore 86 in the emergency piston 70. This arrangement subjects a minimum area of the underside of the inlet valve 56 to emergency reservoir pressure, thus requiring a minimum force to be exerted by the relay piston 30 to open the valve 56 when the former is moved downwardly by a service application of the brakes and this feature materially contributes to the sensitivity of the valve.

It will be observed that when the piston 30 moves downwardly during a service application, the lower end of the guide portion 32 first contacts the exhaust valve member 50 and seals the bore 34, thus interrupting communication between the brake actuators 10 and the atmosphere. As the piston 30 continues to move down against the force of spring 44, the inlet valve 56 is opened to admit emergency pressure to the brake actuators 10. When the pressure below piston 30 approximately equals the pressure above the piston, the force of the spring 44 moves the piston upwardly to lap or balanced position with the inlet valve 58 and the exhaust valve 50 just closing their respective passages 86 and 34. In order that the lap range will be a minimum, the areas of the exhaust and inlet valves are designed to be substantially equal and each of these areas is designed to be substantially equal to the cross-sectional area defined by the circumference of the guide portion 32. With this arrangement, it will be apparent that the inlet or service pressure in cavity 38 must equal almost exactly the delivery pressure from the emergency reservoir in cavity 40 so that the lap range thus becomes a minimum.

In order to prevent the inlet and exhaust valves from chattering in their lap position, an orifice 98 is provided between the inlet port 26 and the inlet cavity 38. The orifice is designed to prevent sudden pressure surges in the cavity 38 but nevertheless has sufficient size not to affect noticeably the speed of brake actuation.

Referring again to the emergency portion 46 of the valve, it will be recalled that the upper side of the emergency piston 70 is exposed to main reservoir pressure while the lower side is exposed to emergency reservoir pressure. The functional areas exposed to these respective pressures are designed to cause an unbalance in favor of the main reservoir pressure; that is to say, with the pressure in the main and emergency reservoirs being exactly equal, the area exposed to the main reservoir pressure is greater than that exposed to the emergency reservoir so that the resultant force acts to retain the piston 70 in its down position shown against the upward force of the emergency reservoir pressure. It is this upward force which tends to move the emergency piston 70 upwardly to open the inlet valve for an emergency application of the brakes, and with all other values being equal such as spring force, air seal friction etc., the pressure differential between main and emergency reservoirs at which the valve goes into or out of emergency position can be varied, within limits, by varying the opposing effective areas above and below the emergency piston.

In operation beginning with a no-air condition, the compressor (not shown) delivers fluid pressure to the main reservoir 2 from whence it enters the port 20 in the valve casing and flows to the bore 80 above the emergency piston 70 which is forced downwardly to the stopped position shown in the drawing. Simultaneously, the main reservoir pressure unseats the single check valve 22 allowing fluid pressure to flow to the emergency reservoir 12 through the port 24, as well as through the port 96 in the valve body to the inlet cavity 72 beneath the emergency piston 70. In normal operation, the emergency piston assembly 46 remains in the down position since the main reservoir pressure force is greater on the top of the piston 70 than the opposing emergency reservoir pressure force acting on the bottom of the piston.

In a service application of the brakes, the brake valve 8 is opened admitting service pressure to port 26 to build up pressure gradually in the relay cavity 38 above the relay piston 30 causing the latter to move downwardly against the force of the return springs 44 and the frictional resistance of the air seals associated with the piston. When the piston 30 contacts the exhaust member 50 of the exhaust valve 48 to seal the exhaust passage 34, any additional downward movement of piston 30 causes the opening of the valve 58 of inlet valve 56 which establishes communication between the emergency reservoir 12 and the cavity 40 on the underside of the relay piston 30 and permits the emergency air pressure to build up in the brake chambers 10 via the port 42 and the interconnecting conduit. It will be noted that the area of the relay piston 30 exposed on its top side to brake valve pressure is approximately equal to the area on the underside exposed to emergency reservoir pressure. As a result the delivered pressure to the brake chambers via port 42 is approximately equal to the pressure delivered by the brake valve at port 26. Due to this position area balance, any variation in the applied pressure above the relay piston 30 causes a corresponding change in the pressure delivered to the actuators 10. When the pressures above and below the relay piston are in balance the return spring 44 moves piston 30 upwardly until the exhaust valve 50 and the inlet valve 58 are in lap position, that is, they are on the verge of opening and the one to open is determined by whether the pressure in cavity 38 is increased or decreased. If for example the pressure in cavity 38 is decreased, the piston 30 is urged upwardly, by the relatively higher pressure in cavity 40 and the brake actuators, sufficient to open the exhaust valve 50 and release to atmosphere, via the bore 34 and the strainer 37, the required excess pressure to restore the balance as determined by the control pressure in cavity 38.

In an emergency of the type where the emergency conduit 6, connected to port 20 of the valve, is parted or severely fractured, the sudden loss of pressure above the emergency piston 70 and the resultant pressure differential across the piston 70 cause the piston to move upwardly closing the exhaust valve 50 and in rapid succession opening inlet valve 58 to admit emergency reservoir pressure to charge the brake actuators 10 via cavity 72, cavity 40, and port 42. Simultaneously with the loss of pressure at port 20 the one-way check valve 22 effects a seal to prevent the loss of any emergency reservoir air to the port 20 and thence to atmosphere through the leak. The valve is restored to normal operating position by restoring the main reservoir pressure at port 20 to a magnitude somewhat less than that of the emergency reservoir pressure at port 24.

With a slow leak in the main reservoir system or at port 20 the emergency action is the same as described for the case when the conduit at port 20 is severed except that the action of building up the pressure in the cavity 40 and also in the brake actuators is very gradual depending on the rate of bleed-down of the main reservoir pressure at port 20.

An important feature of the valve of Fig. 1 resides in the means through which the automaticv emergency brake application is accomplished, this means being the regulation of the opposing effective areas of the emergency piston exposed to main and emergency reservoir pressures. It will be noted that the main reservoir pressure, that is, the pressure at port 20, acts on an area of the emergency piston contained between the bores 80 and 84 in the valve body. In opposition to this resulting downward force there is the force upward resulting from the action of the emergency air pressure, that is, the pressure at port 24, on the area of the emergency piston confined between the bore 80 in casing 18 and the bore 92 in the cap-nut 90. By varying the ratios of the aforesaid areas the differential pressure at which the emergency feature functions can be established. However, once established this differential pressure is inherent and varies only with the small change that may result from the frictional force of the elements in actual service.

In the foregoing description the emergency portion 46 of the valve functions with a fixed fluid pressure differential. By this is meant that when a pressure differential between the main reservoir 2 and the emergency resorvoir 12 of a fixed amount results, regardless of the pressure magnitudes in the reservoirs, an emergency operation of the valve follows. In some applications it may be desirable to have the emergency portion 46 of the valve operate at a fixed magnitude of main reservoir pressure in which case, the variation can be obtained by making the emergency portion 46 spring suspended, as shown in Fig. 2, instead of air suspended as in the case of Fig. 1.

The modification shown in Fig. 2 is similar to the form shown in Fig. 1 except that the effect of the fluid pressure within the emergency reservoir 12 upon the piston 70 is balanced and a preloaded spring 100 is confined within the cavity between the cap-nuts 90 and 76. As shown, the cap-nut 76 slidably engages a bore 102 in the casing 18, and the bore 102 is equal to the bore 80. Thus, with this modification, the pressure in the cavity 72 in the piston 70 will not be effective as an opposing force to that imposed on the piston 70 by the main reservoir pressure at the inlet 20. It will be noted now that the only force opposing the main reservoir pressure on the piston 70 is that due to the preloaded spring 100, introduced in the cavity between cap-nut 76 and cap-nut 90, which biases the piston assembly upward against the downward force of the main reservoir pressure. With this modification it will be noted that the force of the preloaded spring 100 is the determining factor as to the main reservoir pressure at which the valve will make an automatic emergency application. It will further be noted that the rate of brake application in automatic emergency is a function of the rate of pressure drop from a predetermined minimum value as determined by the preloaded spring force. For example, should the loss of pressure at port 20 be rapid, such as would result from a severed conduit 6, the automatic emergency would be practically instantaneous, resulting in a dynamiting brake application. However, should the loss of pressure at port 20 be slow, such as may be expected as a result of a loose conduit fitting or a slightly fractured conduit, the automatic emergency application will be slow, from the predetermined minimum pressure, and dependent on the rate of main reservoir pressure drop. In this embodiment of the invention the magnitude of automatic emergency brake application is inversely proportional to the main reservoir pressure, as in the case of the valve of Fig. 1.

The embodiment of Fig. 2 differs also from that of Fig. 1 in that on pressure build-up in the system, from the no air condition, the pressure routed to the emergency reservoir 12 is simultaneously routed to the brake actuators 10 since the preloaded spring 100 holds the valve in emergency position. This causes the brakes to be held applied until sufficient pressure is stored in the main reservoir 2, and in turn on the top side of the piston 70, to overpower the preloaded emergency spring 100. As a safety measure, this feature has advantages in that it prevents the movement of the vehicle until a satisfactory or ample supply of braking power is available. When the force of the main reservoir pressure exceeds that of the preloaded spring 100, the piston assembly 70 is moved to its lower or released position causing the emergency release of the brakes and positioning the device for normal operation, as shown in Fig. 2.

One of the advantages of the invention over previous valves of similar character resides in its adaptability for service. It will be noted that all conduit connections are made to the body member 18 of the valve which is the member of the valve that is rigidly attached to a component of the vehicle. This permits the cleaning or replacement of internal parts of the valve without disturbing the conduit connections.

Having now described two embodiments of the invention, it will be apparent to those skilled in the art that the same is susceptible of many changes and modifications and such changes and modifications are intended to be included within the purview of the invention without, however, departing from the scope and spirit of the appended claims.

What is claimed is:

1. A relay emergency valve for controlling the application of pressure from a source of pressure to brake chambers in response to pressure variations in a service line and effective for establishing application of pressure from said source to said brake chambers in response to loss of pressure from an emergency line, which valve comprises a body providing a passage for connection between said source of pressure and said brake chambers, an inlet valve member movable to open and close said passage, an exhaust valve integrally connected to said inlet valve for simultaneous movement therewith, a relay member responsive to pressure variations in the service line and having an exhaust opening therethrough, said relay member being movable into contact with said exhaust valve for closing said exhaust opening and then moving said inlet valve to open said passage, and a piston in said body movable independently of said relay member for controlling said inlet and said exhaust valves, said piston having a cavity forming a portion of said passage and said inlet valve member being positioned in said cavity, said piston being normally maintained in a first position by pressure from the emergency line and being movable to an emergency position upon loss of pressure in the emergency line to close said exhaust valve and open said inlet valve to effect an emergency application of said brakes.

2. A relay emergency valve for controlling the application of pressure from a source of pressure to brake chambers in response to pressure variations in a service line and effective for establishing application of pressure from said source to said brake chambers in response to loss of pressure from an emergency line, which valve comprises a body providing a passage for connection between said source of pressure and said brake chambers, an inlet valve member movable to open and close said passage, an exhaust valve integrally connected to said inlet valve for simultaneous movement therewith, a relay member responsive to pressure variations in the service line and having an exhaust opening therethrough, said relay member being movable into contact with said exhaust valve for closing said exhaust opening and then moving said inlet valve to open said passage, and a piston in said body movable independently of said relay member for controlling said inlet and said exhaust valves, said piston having a cavity forming a portion of said passage and said inlet valve member being positioned in said cavity, said piston being normally maintained in a first position by pressure from the emergency line, and resilient means for moving said piston to an emergency position upon loss of pressure in the emergency line to close said exhaust valve and open said inlet valve to effect an emergency application of said brakes.

3. A relay emergency valve for controlling the application of pressure from a source of pressure to brake chambers in response to pressure variations in a service line and effective for establishing application of pressure from said source to said brake chambers in response to loss of pressure from an emergency line, which valve comprises a body, a relay member in said body responsive to pressure in said service line and having an exhaust passage therethrough for connecting said brake chambers to atmosphere, an emergency piston responsive to pressure in said emergency line and having an inlet passage therethrough for connecting said brake chambers to said pressure source, an inlet valve resiliently urged to closed position for controlling said passage in said piston, an exhaust valve integrally connected to said inlet valve for simultaneous movement therewith, said exhaust valve closing said exhaust passage through said relay member upon movement thereof thereagainst, said inlet valve being thereafter opened upon continued movement of said relay member, said emergency piston being movable upon loss of pressure in said emergency line for effecting closing of said exhaust valve and then opening of said inlet valve to effect an emergency application of said brakes.

4. A relay emergency valve for controlling the application of pressure from a source of pressure to brake chambers in response to pressure variations in a service line and effective for establishing application of pressure from said source to said brake chambers in response to loss of pressure from an emergency line, which valve comprises a body, a relay member in said body responsive to pressure in said service line and having an exhaust passage therethrough for connecting said brake chambers to atmosphere, an emergency piston responsive to pressure in said emergency line and having an inlet passage therethrough for connecting said brake chambers to said pressure source, an inlet valve resiliently urged to closed position for controlling said passage in said piston, an exhaust valve integrally connected to said inlet valve for simultaneous movement therewith, said exhaust valve closing said exhaust passage through said relay member upon movement thereof thereagainst, said inlet valve being thereafter opened upon continued movement of said relay member, and resilient means for moving said emergency piston upon loss of pressure in said emergency line for effecting closing of said exhaust valve and then opening of said inlet valve to effect an emergency application of said brakes.

5. A relay emergency valve for controlling the application of pressure from a source of pressure to brake chambers in response to pressure variations in a service line and effective for establishing application of pressure from said source to said brake chambers in response to loss of pressure from an emergency line, which valve comprises, a body, a relay means in said body movable in response to pressure variations in said service line and having an exhaust passage therethrough, an emergency piston in said body movable in response to pressure loss in said emergency line and having an inlet passage therethrough, an inlet valve for controlling said inlet passage in said piston, an exhaust valve for controlling said exhaust passage through said relay means, an operative connection between said exhaust valve and said inlet valve, resilient means normally urging said valves toward their closed positions, said exhaust valve being normally closed by movement of said relay means thereagainst and said inlet valve being thereafter opened by further movement of said relay means, means for moving said emergency piston upon loss of pressure in said emergency line in a direction permitting said resilient means to move said exhaust valve against said exhaust passage to close the same and stop further movement of said exhaust and inlet valves, continued movement of said emergency piston withdrawing said inlet passage from said inlet valve to effect an emergency connection between said brake chambers and said pressure source.

6. A relay emergency valve for controlling the application of pressure from a source of pressure to brake chambers in response to pressure variations in a service line and effective for establishing application of pressure from said source to said brake chambers in response to loss of pressure from an emergency line, which valve comprises, a body, a relay means in said body movable in response to pressure variations in said service line and having an exhaust passage therethrough, an emergency piston in said body movable in response to pressure loss in said emergency line and having an inlet passage therethrough, an inlet valve for controlling said inlet passage in said piston, an exhaust valve for controlling said exhaust passage through said relay means, an operative connection between said exhaust valve and said inlet valve, resilient means normally urging said valves toward their closed positions, said exhaust valve being normally closed by movement of said relay means thereagainst and said inlet valve being thereafter opened by further movement of said relay means, spring means for moving said emergency piston upon loss of pressure in said emergency line in a direction permitting said resilient means to move said exhaust valve against said exhaust passage to close the same and stop further movement of said exhaust and inlet valves, continued movement of said emergency piston withdrawing said inlet passage from said inlet valve to effect an emergency connection between said brake chambers and said pressure source.

7. A relay emergency valve for operation of brakes in connection with a service line, an emergency line, a source of main fluid pressure, and a source of emergency fluid pressure, said valve comprising a body having a relay chamber therein, means for connecting said relay chamber to said service line, a relay means operating in said relay chamber in response to variation of pressure in said service line and having an exhaust passage therethrough, an emergency piston in said body having an inlet passage therethrough, means for connecting at all times one side of said emergency piston to the pressure in said main source, means for connecting the other side of said piston at all times to the pressure in said emergency source, the pressure force from said main source normally exceeding the pressure force from said emergency source to maintain said piston in a first normal position, an inlet valve for controlling the passage through said emergency piston, an exhaust valve integrally connected to said inlet valve for controlling the exhaust passage through said relay means, resilient means normally urging said valves toward their closed positions, said exhaust passage being normally closed by movement of said relay means thereagainst and said inlet valve being thereafter opened by continued movement of said relay means, said emergency piston being moved to emergency position when the force from said main source falls below the force from said emergency source of fluid pressure permitting closing of said exhaust valve and opening of said inlet valve to effect an emergency connection of said emergency source with said brake.

8. The relay emergency valve in accordance with claim 7 in which a restricting orifice is included between said service line and said relay chamber to dampen pressure surges therein.

9. The relay emergency valve in accordance with claim 7 wherein the emergency piston is provided with greater area on the side exposed to pressure from the main source than the area of the side exposed to pressure from the emergency source.

10. A relay emergency valve for operation of brakes in connection with a service line, an emergency line, a main source of fluid pressure and an emergency source of fluid pressure, comprising a body providing a first passage from said emergency source of fluid pressure to the brake chamber, a second passage for connecting said brake chambers to atmosphere, a first valve movable to open and close said first passage, a second valve movable to open and close said second passage, an operative connection between said first and second valves whereby the second valve is always moved to closed position before said first valve is moved to open position and vice versa, a relay member responsive to pressure variations in said service line to operate said valves, a pressure responsive device in said valve body having a passage therethrough forming a portion of said first passage, said device having one side exposed at all times to a pressure force from said main pressure source and having the other side exposed at all times to a pressure force from said emergency source of fluid pressure, said first pressure force being normally greater than said second pressure force for retaining said device in a first normal position, said device being movable to a second emergency position when the pressure force from the main source falls below the pressure force from the emergency source, and means for closing said exhaust valve and opening said first valve independently of said relay means when said pressure responsive means moves from its normal position to its emergency position to admit fluid pressure from said emergency pressure source to said brake chamber to effect automatic emergency setting of said brakes.

11. An emergency valve for controlling the application of pressure from a source of pressure to brake chambers in response to loss of pressure from an emergency line, which valve comprises a casing having a passage therein, an emergency piston responsive to pressure in said emergency line and having an inlet passage therethrough for connecting said brake chambers to said pressure source, a first valve resiliently urged to closed position for controlling said passage in said piston, said first valve having an elongated stem having upper and lower portions respectively extending above and below said first valve, a second valve integrally connected to the upper stem portion of said first valve for simultaneous movement therewith for controlling the passage in the casing, said emergency piston including a part having a bore for slideably receiving said lower stem portion, the cross sectional areas of said bore and said inlet passage being substantially equal, and said emergency piston being movable upon loss of pressure in said emergency line for effecting closing of said second valve and then opening of said first valve to effect an emergency application of said brake.

12. An emergency valve for controlling the application of pressure from a source of pressure to brake chambers in response to loss of pressure from an emergency line, which valve comprises, a casing having a passage therein, an emergency piston in said casing movable in response to pressure loss in said emergency line and having an inlet passage therethrough, a first valve for controlling said inlet passage in said piston, said first valve having an elongated stem having upper and lower portions respectively extending above and below said first valve, means including a second valve connected to the upper stem portion of the first valve for controlling the passage in the casing, resilient means normally urging said valves toward their closed positions, said emergency piston including a part having a bore for slideably receiving said lower stem portion, the cross sectional areas of said bore and said inlet passage being substantially equal, and spring means for moving said emergency piston upon loss of pressure in said emergency line in a direction permitting said resilient means to move said second valve to close the passage in the casing and stop further movement of said valves, continued movement of said emergency piston withdrawing said inlet passage from said first valve to effect an emergency connection between said brake chambers and said pressure source.

13. An emergency valve for operation of brakes in connection with a source of main fluid pressure, and a source of emergency fluid presure, said valve comprising a casing having a passage therein, an emergency piston in said casing having an inlet passage therethrough, means for connecting at all times one side of said emergency piston to the pressure in said main source, means for connecting the other side of said piston at all times to the pressure in said emergency source, the pressure force from said main source normally exceeding the pressure force from said emergency force to maintain said piston in a first normal position, a first valve for controlling the passage through said emergency piston, a second valve integrally connected to said first valve for controlling the passage in the casing, resilient means normally urging said valves toward their closed positions, said emergency piston being moved to emergency position when the force from said main source falls below the force from said emergency source of fluid pressure permitting closing of said second valve and simultaneous withdrawal of said inlet passage from said first valve to effect an emergency connection of said emergency source with said brakes.

14. The relay emergency valve in accordance with claim 13 wherein the emergency piston is provided with greater area on the side exposed to pressure from the main source than the area of the side exposed to pressure from the emergency source.

15. A relay valve for controlling the application of pressure from a source of pressure to brake chambers in response to pressure variations in a service line, comprising a body, a relay piston in said body responsive to pressure in the service line and having a centrally disposed exhaust passage therethrough for connecting the brake chambers to atmosphere, means within the body providing an inlet passage for connecting the brake chambers to the pressure source, an inlet valve resiliently urged to closed position for controlling the inlet passage, said inlet valve having an elongated stem having upper and lower portions respectively extending above and below the inlet valve, an exhaust valve connected to the upper stem portion for simultaneous movement with the inlet valve, said exhaust valve closing the exhaust passage through the relay piston upon movement therewith against, said inlet valve being thereafter opened upon continued movement of the relay piston to open said inlet passage, and a member having a bore for slideably receiving said lower stem portion, the cross sectional areas of said bore and said inlet passage being substantially equal and said elongated stem having a through passage for connecting said bore and exhaust passage.

References Cited in the file of this patent

UNITED STATES PATENTS

| 1,936,966 | Kasantzeff | Nov. 28, 1933 |
| 2,049,984 | Vorech et al. | Aug. 4, 1936 |
| 2,088,185 | Borde | July 27, 1937 |
| 2,586,196 | Affleck | Feb. 19, 1952 |
| 2,656,014 | Fites | Oct. 20, 1953 |